(12) United States Patent
Jang et al.

(10) Patent No.: US 10,052,703 B2
(45) Date of Patent: Aug. 21, 2018

(54) SILICON WAFER SLICING DEVICE USING WIRE DISCHARGE MACHINING

(71) Applicant: KOREA INSTITUTE OF ENERGY RESEARCH, Daejeon (KR)

(72) Inventors: Bo-Yun Jang, Daejeon (KR); Sun-Ho Choi, Daejeon (KR); Hee-Eun Song, Incheon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 386 days.

(21) Appl. No.: 14/800,658

(22) Filed: Jul. 15, 2015

(65) Prior Publication Data
US 2016/0016243 A1 Jan. 21, 2016

(30) Foreign Application Priority Data
Jul. 16, 2014 (KR) .................... 10-2014-0090083

(51) Int. Cl.
| | |
|---|---|
| *B23H 5/02* | (2006.01) |
| *B23H 7/02* | (2006.01) |
| *B23H 7/04* | (2006.01) |
| *B23H 7/08* | (2006.01) |
| *B23H 7/36* | (2006.01) |
| *B23H 9/00* | (2006.01) |

(52) U.S. Cl.
CPC ............. *B23H 7/08* (2013.01); *B23H 5/02* (2013.01); *B23H 7/02* (2013.01); *B23H 7/04* (2013.01); *B23H 7/36* (2013.01); *B23H 9/00* (2013.01)

(58) Field of Classification Search
CPC ... B23H 5/02; B23H 7/02; B23H 7/04; B23H 7/08
See application file for complete search history.

(56) References Cited

U.S. PATENT DOCUMENTS

| | | | | |
|---|---|---|---|---|
| 2006/0102596 A1* | 5/2006 | Kinoshita | ............... | B23H 7/04 219/69.12 |
| 2013/0075274 A1* | 3/2013 | Wang | .................... | B23H 5/06 205/662 |

FOREIGN PATENT DOCUMENTS

| | | |
|---|---|---|
| JP | 09248719 A | 9/1997 |
| JP | 2010260151 A * | 11/2010 |

(Continued)

OTHER PUBLICATIONS

Korean Office Action dated Sep. 2, 2015 in connection with the counterpart Korean Patent Application No. 10-2014-0090083.

*Primary Examiner* — Nicholas A Smith
(74) *Attorney, Agent, or Firm* — Hauptman Ham, LLP (57) ABSTRACT

Disclosed is a wafer slicing apparatus which cuts a silicon ingot to fabricate a silicon wafer, and more specifically, a silicon wafer slicing apparatus cutting the silicon ingot using wire discharge machining is disclosed. The present invention provides a silicon wafer slicing apparatus using wire discharge machining comprising: a water tank which contains an electrolyte; a cutting wire which has a cutting section dipped into the water tank and is transferred by a wire driving means; an ingot transferring unit which includes an electrode on which a silicon ingot, an object to be cut, is fixed, and moves the silicon ingot up and down within the cutting section of the cutting wire; an electrolyte circulating means which circulates and refines the electrolyte stored in the water tank; and a power supply unit which supplies a source voltage to the electrode of the ingot transferring unit and the cutting wire.

8 Claims, 9 Drawing Sheets

(56) References Cited

FOREIGN PATENT DOCUMENTS

| | | | |
|---|---|---|---|
| JP | 2010260151 | A | 11/2010 |
| JP | 2012200801 | A | 10/2012 |
| KR | 1020100015302 | A | 2/2010 |

* cited by examiner

SILICON WAFER SLICING DEVICE USING WIRE DISCHARGE MACHINING

CROSS-REFERENCE TO RELATED APPLICATION

This application claims the benefit of Korean Patent Application No. 10-2014-0090083, filed on Jul. 16, 2014 in the Korean Intellectual Property Office, the disclosure of which is incorporated herein in its entirety by reference.

BACKGROUND

1. Technical Field

The present invention relates to a wafer slicing apparatus which cuts a silicon ingot to fabricate a silicon wafer, and more specifically, to a silicon wafer slicing apparatus which cuts the silicon ingot using wire discharge machining.

2. Description of the Related Art

In order to fabricate a silicon ingot, a mechanical method, which sprays a slurry containing an abrasive (silicon carbide particles) mixed with cutting oil on a wire and cuts the silicon ingot by a friction between sprayed particles and the silicon ingot, or coats the wire with the abrasive, and rubs the coated wire against the silicon ingot to cut the silicon ingot, is used to fabricate a wafer.

By the way, this method requires a lot of money for preparing the wire and the cutting oil and for performing the coating, and it also generates a massive amount of environmental contamination wastes such as silicon carbide or ethylene glycol, which makes a silicon wafer manufacturing a high cost process.

A Korean patent application publication number No. 10-2010-0015302 (publication date: Feb. 12, 2010) entitled "Manipulation method for silicon substrate, manipulation product thereof, and manipulation apparatus" can be referred to as a related prior art.

BRIEF SUMMARY

It is an object of the present invention to provide a silicon wafer slicing apparatus using wire discharge machining which utilizes the wire discharge machining, which is an electrochemical cutting method, to prevent wastes from being formed, and reuse or recycle wires.

It is another object of the present invention to provide a silicon wafer slicing apparatus using wire discharge machining which can fabricate a thin-type silicon wafer and decrease a damage rate of the wafer during a fabrication process.

The present invention provides a silicon wafer slicing apparatus using wire discharge machining comprising: a water tank which contains an electrolyte; a cutting wire which has a cutting section dipped into the water tank and is transferred by a wire driving means; an ingot transferring unit which includes an electrode on which a silicon ingot, an object to be cut, is fixed, and moves the silicon ingot up and down within the cutting section of the cutting wire; an electrolyte circulating means which circulates and refines the electrolyte stored in the water tank; and a power supply unit which supplies a source voltage to the electrode of the ingot transferring unit and the cutting wire such that an arc discharge and electrolysis occur between the silicon ingot fixed on the ingot transferring unit and the cutting wire.

There can be a plurality of cutting wires and the cutting wires can be arranged to be parallel with each other in the cutting section.

At this point, the cutting wire can be made of a metal material selected from a group consisting of gold, silver, platinum, iron, copper, and nickel or of an alloy material which is made by using one material selected from the group as a main component.

Meanwhile, it is preferred that the power supply unit applies a voltage in a direct current (DC) pulse shape, and it is more preferred that the power supply unit alternately applies an arc discharge pulse having a relatively high voltage and an electrolytic machining pulse having a relatively low voltage.

At this point, a peak voltage of the arc discharge pulse is preferably 100-1000 V, and a peak voltage of the electrolytic machining pulse is preferably 5-80 V.

It is more preferred that, when a plurality of cutting wires are provided, the power supply unit alternately applies an arc discharge pulse having a relatively high voltage and an electrolytic machining pulse having a relatively low voltage, wherein peak voltages of the arc discharge pulses applied to the cutting wires are different from each other.

By using the silicon wafer slicing apparatus using wire discharge machining according to the present invention, arc discharge machining and electrolysis machining are performed at the same time, thereby improving a surface roughness of the wafer.

Also, since the silicon wafer slicing apparatus using wire discharge machining according to the present invention can fabricate a wafer with a thickness not greater than 100 μm by alleviating a mechanical weight, it is possible to increase a wafer production amount per silicon ingot and decrease a damage rate during a cutting process.

DETAILED DESCRIPTION

The terms and words used in the specification and claims are not to be construed to be limited by typical or lexical meanings, but to be construed by meanings and concepts coinciding with technical spirits of the present invention based on a principle that an inventor can adequately define a concept of a term in order to describe his/her invention in the most suitable way. Also, since the embodiments set forth in this specification and the configuration illustrated in the appended figures only represent preferred embodiments and do not encompass all technical spirits of the present invention, it is to be appreciated that there can be various equivalents and modifications which can replace them at the time of filing.

Silicon is a semiconductor having an extremely low electrical conductivity. Therefore, a silicon ingot has been regarded as not proper for discharge machining; however it is known recently that an arc discharge can be performed on the silicon by using DC, high voltage, pulse power. However, problems such as surface roughness, surface contamination, thickness non-uniformity, and a low cutting speed still remain with the arc discharge performed on the silicon ingot.

An object of the present invention is to provide an apparatus and a method for fabricating a silicon wafer using an electrochemical cutting process rather than a conventional mechanical cutting process.

Figure 1:
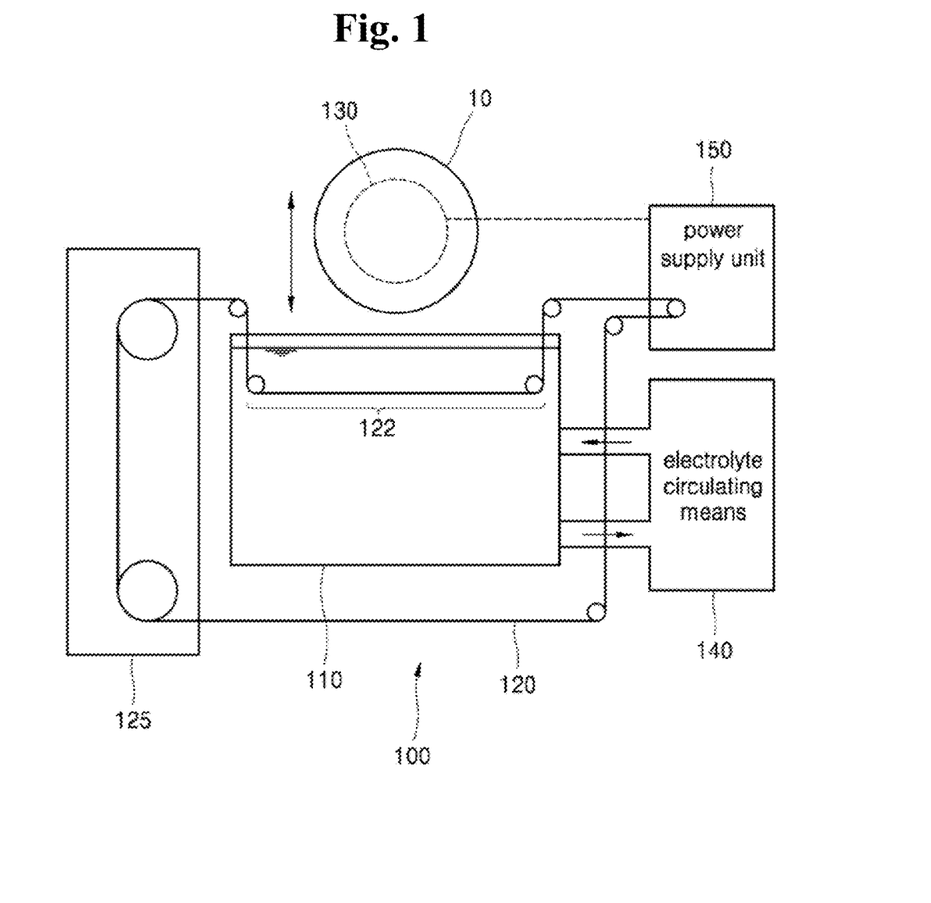
FIG. 1 is a configuration schematic of a silicon wafer slicing apparatus using wire discharge machining according to an embodiment of the present invention.

FIG. 1 is a configuration schematic of a silicon wafer slicing apparatus using wire discharge machining according to an embodiment of the present invention.

As shown in FIG. 1, a silicon wafer slicing apparatus 100 using wire discharge machining according to an embodiment of the invention includes a water tank 110 containing an electrolyte, a cutting wire 120 having a cutting section 122 dipped into the water tank 110 and being transferred by a wire driving means 125, an ingot transferring unit 130 including an electrode, where a silicon ingot 10, an object to be cut, is fixed, and moving the silicon ingot 10 up and down within the cutting section 122 of the cutting wire 120, an electrolyte circulating means 140 circulating and refining the electrolyte stored in the water tank 110, and a power supply unit 150 supplying a source voltage to the electrode of the ingot transferring unit and the cutting wire 120 such that an arc discharge and electrolysis occur between the silicon ingot 10 fixed on the ingot transferring unit 130 and the cutting wire 110.

The electrolyte is contained in the water tank 110, and the cutting section 122 of the cutting wire 120 is formed below the level of the electrolyte. Also, the electrolyte stored in the water tank 110 is circulated by the electrolyte circulating means 140 such that concentration and purity of the electrolyte are maintained.

Hydrofluoric acid, acetic acid, nitric acid, hydrochloric acid, pure water, ethanol, ethylene glycol, potassium hydroxide, sodium hydroxide, fluoride, and sulfide can be used as the electrolyte, or at least two selected among them can be mixed to be used as the electrolyte.

Since the water tank 110 contacts the electrolyte, it should be made of a material having a chemical resistance against the electrolyte or should be coated by the material. The material having a chemical resistance against the electrolyte includes PTFE, PTE, PP, PE, PVC, and urethane.

The ingot transferring unit 130 fixes the silicon ingot 10 on the electrode, and moves the electrode such that the silicon ingot 10 is moved. At an initial stage, the silicon ingot 10 is positioned over the cutting section 122, and as the cutting progresses, the silicon ingot 10 penetrates the cutting section 122 from top to bottom to finish the cutting.

This cutting method can decrease an effect of a weight of the silicon ingot 10 during the cutting process and decrease a thickness of the silicon wafer. When using a mechanical cutting method, the probability of breaking the wafer increases when the wafer is cut to a thickness not greater than 100 μm due to the effect of the weight, and, therefore, it is substantially impossible to cut the wafer to a thickness not greater than 100 μm; however, when using the cutting process according to the present invention, it is possible to cut the wafer to a thickness not greater than 100 μm. Thus, a production amount per ingot is increased and a damage rate during the cutting process is decreased.

Almost every kind of metal materials with relatively high electric conductivities can be used as the cutting wire 120. However, various conditions should be taken into consideration in order to prevent breakage of the wire during a long-time continuous use.

A bending strength of the cutting wire has to be considered first. The cutting wire is transferred by a wire driving means, and bending inevitably happens during the transfer. Therefore, carbon steels, titanium, lanthanum, and molybdenum with low bending properties are not appropriate, and gold, silver, platinum, aluminum, iron, copper, tungsten, and nickel materials with high bending properties can be used.

Also, a bending strength of an oxide film should be considered. Due to the arc discharge, an oxide film is formed on the cutting wire, and this film is removed by electrolysis. However, while considering the time required for the rapidly-formed oxide film to be removed, a film of a ceramic material such as tungsten oxide and aluminum oxide dramatically decreases the bending property, which leads to breakage of the cutting wire at a bending portion. Thus, gold, silver, platinum, iron, copper, and nickel materials can be used.

And, a cutting wire tensile strength also has to be considered. Since a tension between a minimum of 1 N/cm$^2$ and a maximum of 30 N/cm$^2$ has to be applied in order for the cutting wire to maintain an even arrangement state during the cutting process, a material which can withstand this has to be used.

When all of the bending strength of the material itself and the bending strength and tensile strength of the oxide film are considered, gold, silver, platinum, iron, copper, nickel, or an alloy material which is made by using one material selected from those as a main component can be used as the material for the cutting wire.

According to the present invention, discharge machining using an arc is performed simultaneously with an electrolytic machining, which decreases the surface roughness and prevents contamination due to the silicon debris generated during cutting. When performing the discharge machining using the arc alone, it is hard to control the surface roughness below a specific value and contaminants are formed on a surface of the wire and the ingot due to the silicon debris generated during cutting; however, according the present invention, since electrolytic machining is performed at the same time, the surface roughness can be preserved by the electrolytic machining and the contaminants are removed.

Figure 2:
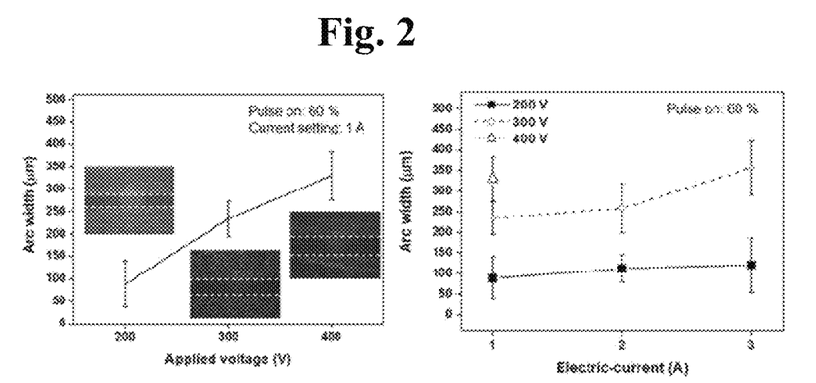
FIG. 2 is a graph showing a cutting width of a crystalline silicon ingot according to voltages and currents.

FIG. 2 is a graph showing a cutting efficiency of a crystalline silicon ingot according to voltages and currents.

The voltage and the current are important factors for determining a cutting efficiency at a specific pulse area.

The silicon having an electrical property of a semiconductor behaves as a nonconductor at an ambient temperature and, therefore, a discharge does not occur when a high voltage is not applied. Experimentally, it is discovered that the discharge occurs at a voltage of about 100 V or higher, and the silicon is broken due to massive thermal energy at 500 V, 1 A.

From FIG. 2, it can be seen that a width of the arc increases as the voltage rises, while the increase in the width of the arc is small as the current increases. Therefore, it can be determined that the voltage contributes to the cutting efficiency more than the current from the graph, and that uniformity of a cut surface relies more on a pulse density than the voltage and the current.

Figure 3:
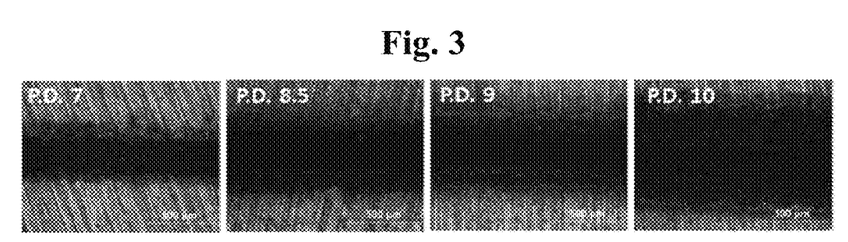
FIG. 3 is a photograph showing a cutting width of a crystalline silicon ingot according to power densities.

FIG. 3 is a photograph showing a cutting width of a crystalline silicon ingot according to power densities.

The power density relies on a voltage, a current amount, and a pulse, and it assumes a minimum value of a power supply device, when close to 0, and a maximum value, when close to 20. When the power density is not greater than 7, no arc is generated due to the low voltage. On the other hand, a thermal shock is applied on the silicon due to the heat accompanying a strong arc to break the ingot for the power density greater than or equal to 10.

Figure 4:
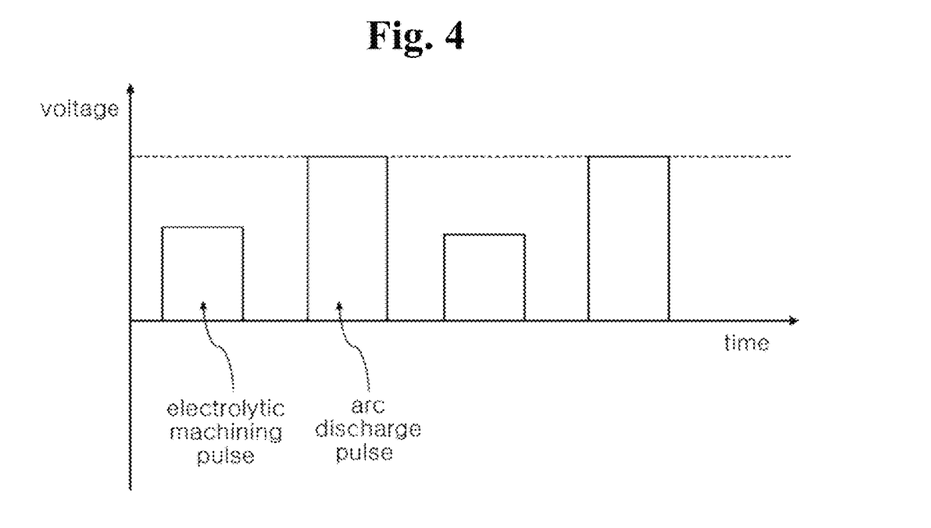
FIG. 4 is a diagram showing a direct current (DC) pulse type voltage applied by a power supply unit according to an embodiment of the invention.

FIG. 4 is a diagram showing a direct current (DC) pulse type voltage applied by a power supply unit according to an embodiment of the invention.

For silicon, a generic discharge voltage of not less than 100 V is required, and the silicon is broken due to the electric-thermal shock, when a voltage of about 1000 V is applied. Thus, a pulse type voltage has to be applied to stably generate the arc.

Since the present invention adopts the arc discharge and the electrolysis as main cutting methods, it is characterized in that an arc discharge pulse with a relatively high voltage and an electrolytic machining pulse of a relatively low voltage are alternately applied.

At this point, it is preferred that a peak voltage of the arc discharge pulse is 100-1000 V and a peak voltage of the electrolytic machining pulse is 5-80 V.

When the peak voltage of the arc discharge pulse is lower than 100 V, no arc can be generated, while the silicon is broken when it exceeds 1000 V, When the electrolytic machining voltage exceeds 80 V, arc can be generated and degrade the surface roughness, while, when it is lower than 5 V, electrolysis efficiency is too low and great improvement on the surface roughness cannot be obtained.

The sustaining time of the arc discharge pulse is preferably in a range of 0.1-20 μsec. When the sustaining time of the arc discharge pulse is shorter than or equal to 0.1 μsec, the arc discharge is greatly decreased in comparison to a signal transfer speed of a pulse generating device, and a smooth cutting cannot be realized. On the other hand, the pulse sustaining time longer than or equal to 20 μsec causes breakage of the wire which interrupts the cutting process.

The sustaining time of the electrolytic machining pulse is preferably longer than 20 μsec.

When the sustaining time of the electrolytic machining pulse is shorter than 20 μsec, the electrolytic machining effect is insufficient and the surface roughness of a desired level cannot be obtained.

Figure 5:
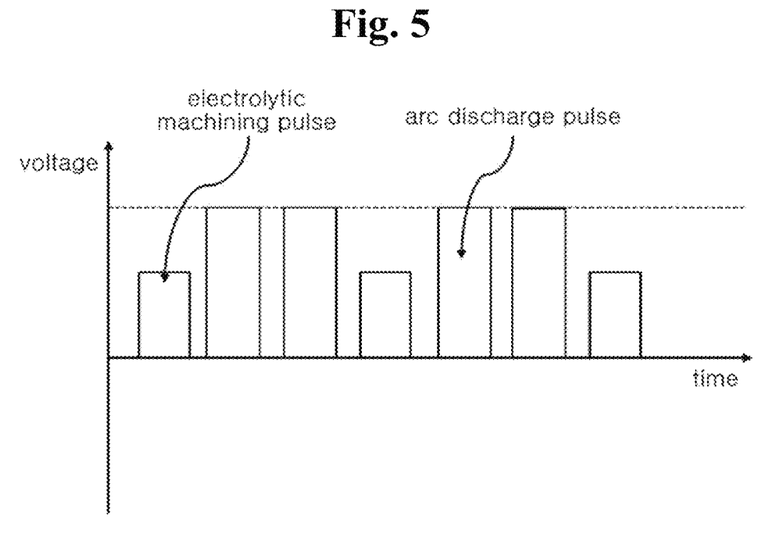
FIGS. 5 and 6 are diagrams showing a DC pulse type voltage according to an another embodiment of the present invention.
Figure 6:
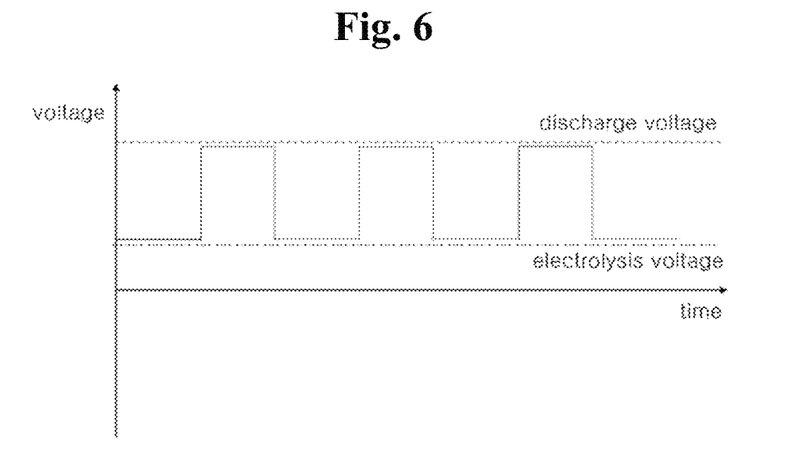

FIGS. 5 and 6 are diagrams showing a DC pulse type voltage according to another embodiment of the present invention.

As for the embodiment shown in FIG. 4, the electrolytic machining pulse and the arc discharge pulse are alternately applied one by one; for the embodiment shown in FIG. 5, two arc discharge pulses are repeatedly applied before one electrolytic machining pulse in an alternate pattern; and for the embodiment shown in FIG. 6, the electrolytic machining pulse and the arc discharge pulse are successively applied without a rest period in a way that the arc discharge voltage is applied as a pulse while the electrolytic pulse is applied.

The source voltage applied by the power supply unit according to the present invention can change an order of voltages, a time duration of the voltage, a magnitude of the voltage, etc. in various ways in addition to the examples shown in the aforementioned embodiments.

Figure 7:
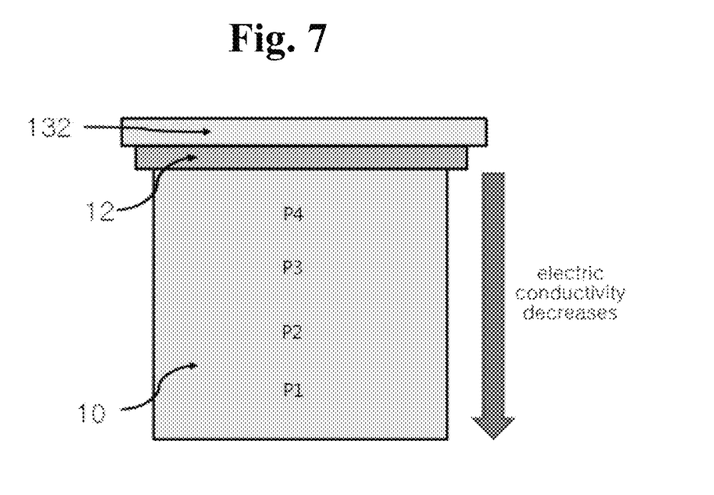
FIG. 7 is a plan view showing a fixing state of the silicon ingot fixed on an electrode of an ingot transferring unit.
Figure 8:
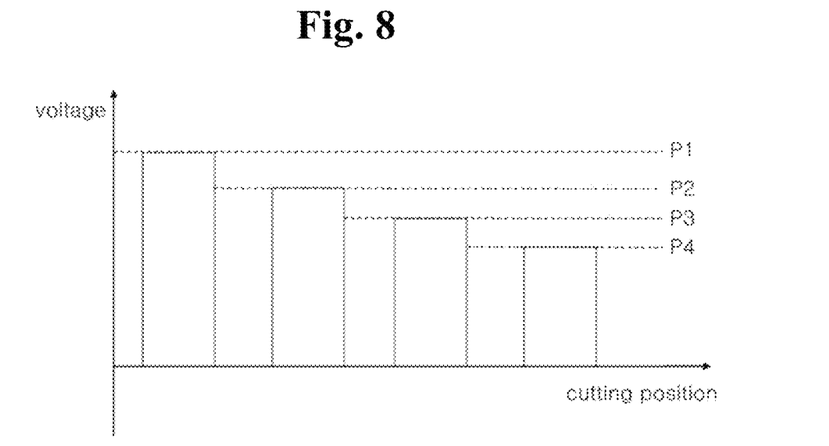
FIG. 8 is a diagram showing applied voltages at cutting positions according to FIG. 7.

FIG. 7 is a plan view showing a fixing state of the silicon ingot fixed on an electrode of an ingot transferring unit, FIG. 8 is a diagram showing applied voltages at cutting positions according to FIG. 7.

As shown in the figures, the silicon ingot 10 can be attached to an electrode 132 of the ingot transferring unit by way of a conductive adhesive 12.

Since silicon is a matter with properties close to those of a nonconductor, electric conductivity greatly decreases as a distance from the electrode 132 increases. Thus, when four positions P1, P2, P3, P4 of the silicon ingot 10 are sequentially cut, a high voltage is to be applied at an initial cutting for P1 while a relatively low voltage is to be applied at a latter cutting for P4 in order to generate the arc discharge smoothly. When the high voltage is applied at the latter cutting, silicon can be broken due to the electric-thermal shock applied to it.

The four positions can be cut at the same time by using four cutting wires, and in this case, different voltages are to be applied to the respective cutting wires for the respective positions as mentioned above.

Figure 9:
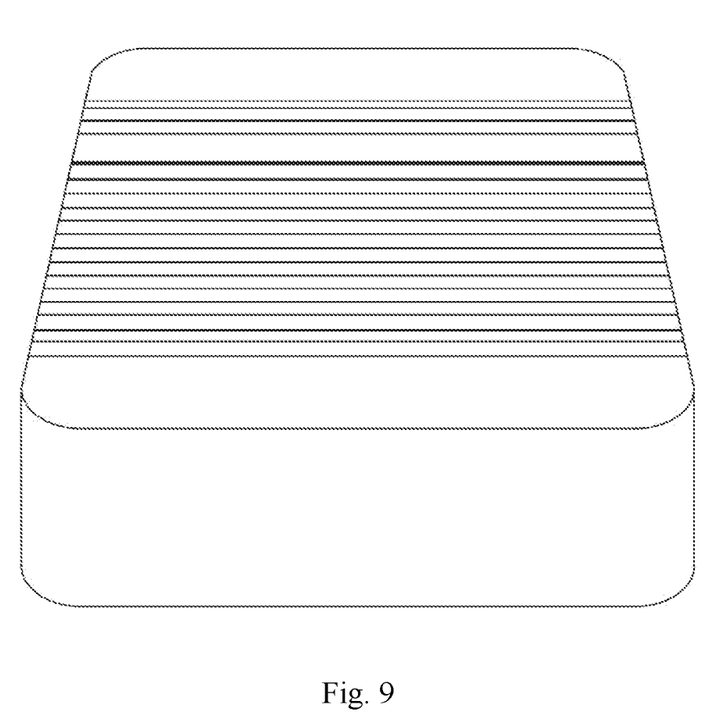
FIG. 9 is a line drawing of a photograph showing a silicon ingot cut by using the silicon wafer slicing apparatus using wire discharge machining according to the present invention.

FIG. 9 is a line drawing of a photograph showing a surface of a silicon ingot cut by using the silicon wafer slicing apparatus using wire discharge machining according to the present invention, and it shows the cut state of the ingot while maintaining a spacing between cutting wires.

It can be seen from FIG. 9 that a uniform cutting is realized on an overall area.

As noted above, the silicon wafer slicing apparatus using wire discharge machining according to the present invention generates an arc discharge on the cutting wire to electrolyze the silicon in a rapid manner, such that the secondary polishing and cleaning effects can be obtained on the rapidly-cut surface due to the electric field formed around the cutting wire and an electrolysis effect of the electrolyte while the silicon ingot is cut, thereby guaranteeing uniform surface quality on the cut surface.

The aforementioned embodiments are to be accepted in an illustrative way rather than in a restrictive way in all aspects, and a scope of the present invention will be elucidated not be the detailed description above but by the following claims. Also, not only the meanings and scopes of the following claims but also all modifications and changeable configurations which are derived from equivalent concepts thereof are to be construed to fall in the scope of the present invention.

EXPLANATIONS TO SYMBOLS

100: silicon wafer slicing apparatus using wire discharge machining
110: water tank
120: cutting wire
130: ingot transferring unit
140: electrolyte circulating means
150: power supply unit

What is claimed is:
1. A silicon wafer slicing apparatus using wire discharge machining comprising:
    a water tank which contains an electrolyte;
    a cutting wire which has a cutting section dipped into the water tank and is transferred by a wire driving means, wherein the cutting wire is configured to sequentially cut a plurality of points of a silicon ingot which is an object to be cut;

an ingot transferring unit which includes an electrode on which the silicon ingot is fixed, and moves the silicon ingot up and down within the cutting section of the cutting wire;

an electrolyte circulating means which circulates and refines the electrolyte stored in the water tank; and a power supply unit which supplies a source voltage to the electrode of the ingot transferring unit and the cutting wire such that an arc discharge and electrolysis occur between the silicon ingot fixed on the ingot transferring unit and the cutting wire, wherein the power supply is configured to supply a highest voltage when the cutting wire is cutting a first point of the silicon, and the power supply is configured to gradually reduce the supplied voltage so that a lowest voltage is supplied when the cutting wire is cutting a last point of the silicon ingot.

2. The silicon wafer slicing apparatus using wire discharge machining according to claim 1, characterized in that a plurality of cutting wires are provided and the cutting wires are arranged to be parallel with each other in the cutting section.

3. The silicon wafer slicing apparatus using wire discharge machining according to claim 1, characterized in that the cutting wire is made of a metal material selected from a group consisting of gold, silver, platinum, iron, copper, and nickel or of an alloy material which is made by using one material selected from the group as a main component.

4. The silicon wafer slicing apparatus using wire discharge machining according to claim 1, characterized in that the power supply unit applies a voltage in a direct current (DC) pulse shape.

5. The silicon wafer slicing apparatus using wire discharge machining according to claim 4, characterized in that the power supply unit alternately applies an arc discharge pulse having a relatively high voltage and an electrolytic machining pulse having a relatively low voltage.

6. The silicon wafer slicing apparatus using wire discharge machining according to claim 5, characterized in that a peak voltage of the arc discharge pulse is 100-1000 V, and a peak voltage of the electrolytic machining pulse is 5-80 V.

7. The silicon wafer slicing apparatus using wire discharge machining according to claim 5, characterized in that a sustaining time of the arc discharge pulse is 0.1-20 μsec.

8. The silicon wafer slicing apparatus using wire discharge machining according to claim 2, characterized in that the power supply unit alternately applies an arc discharge pulse having a relatively high voltage and an electrolytic machining pulse having a relatively low voltage, wherein peak voltages of the arc discharge pulses applied to the cutting wires are different from each other.

* * * * *